US009977901B2

(12) United States Patent
Eytan et al.

(10) Patent No.: US 9,977,901 B2
(45) Date of Patent: *May 22, 2018

(54) TECHNOLOGIES FOR PROTECTING SYSTEMS AND DATA TO PREVENT CYBER-ATTACKS

(71) Applicant: Operation and Data Integrity Ltd., Rosh Ha'Ayin (IL)

(72) Inventors: Oren Eytan, Rosh Ha'Ayin (IL); David Geva, Rosh Ha'Ayin (IL)

(73) Assignee: Operation and Data Integrity Ltd., Rosh Ha'Ayin (IL)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/412,187

(22) Filed: Jan. 23, 2017

(65) Prior Publication Data

US 2017/0132416 A1    May 11, 2017

Related U.S. Application Data

(63) Continuation of application No. 14/600,672, filed on Jan. 20, 2015, now Pat. No. 9,582,665.

(Continued)

(51) Int. Cl.
*G06F 11/00* (2006.01)
*G06F 21/56* (2013.01)
*H04L 29/06* (2006.01)

(52) U.S. Cl.
CPC ........ *G06F 21/568* (2013.01); *H04L 63/1425* (2013.01); *H04L 63/1441* (2013.01); *G06F 2221/033* (2013.01)

(58) Field of Classification Search
CPC .................................. G06F 21/55; G06F 21/56
(Continued)

(56) References Cited

U.S. PATENT DOCUMENTS 7,263,561 B1    8/2007  Green et al.
7,293,177 B2 *  11/2007  Lahti .................... G06F 21/566
                                                      712/200

(Continued)

OTHER PUBLICATIONS

Chamorro et al., "The Design and Implementation of an Antivirus Software Advising System," Information Technology: New Generations (ITNG), 2012 Ninth International Conference on Year: 2012 pp. 612-617.*

(Continued)

*Primary Examiner* — Roderick Tolentino
(74) *Attorney, Agent, or Firm* — Ulmer & Berne LLP

(57) ABSTRACT

Technologies for protecting systems and data of an organization from malware include a data integrity server configured to receive a data file for import from an external source. The data integrity server analyzes the received data file with multiple anti-malware engines to determine whether the data file includes hidden malware. The data integrity server discards the data file in response to a determination that the data file includes hidden malware. Additionally, the data integrity server verifies the type of the received data file based on the file extension associated with the received data file. The data integrity server cleans the received data file in response to verification of the file type. The cleaned data file is transmitted to a computing device to be imported. Other embodiments are described and claimed.

20 Claims, 4 Drawing Sheets

Related U.S. Application Data

(60) Provisional application No. 61/929,576, filed on Jan. 21, 2014.

(58) Field of Classification Search
    USPC ...................................................... 726/22–25
    See application file for complete search history.

(56) References Cited

U.S. PATENT DOCUMENTS

| | | | |
|---|---|---|---|
| 2004/0123136 A1 | 6/2004 | Jung | |
| 2005/0132206 A1* | 6/2005 | Palliyil | G06F 21/566 |
| | | | 713/188 |
| 2008/0016339 A1 | 1/2008 | Shukla | |
| 2008/0127347 A1* | 5/2008 | Benton | G06F 21/56 |
| | | | 726/24 |
| 2008/0209551 A1 | 8/2008 | Treacy et al. | |
| 2008/0282351 A1* | 11/2008 | Khilnani | G06F 21/567 |
| | | | 726/24 |
| 2008/0313735 A1 | 12/2008 | Harrison et al. | |
| 2009/0282485 A1* | 11/2009 | Bennett | H04L 63/145 |
| | | | 726/24 |
| 2010/0262584 A1* | 10/2010 | Turbin | G06F 21/564 |
| | | | 707/674 |
| 2011/0214186 A1* | 9/2011 | Khilnani | G06F 21/00 |
| | | | 726/24 |
| 2012/0124007 A1* | 5/2012 | Sten | G06F 11/1448 |
| | | | 707/685 |
| 2013/0305368 A1* | 11/2013 | Ford | G06F 21/568 |
| | | | 726/23 |
| 2014/0007239 A1* | 1/2014 | Sharpe | G06F 21/561 |
| | | | 726/24 |
| 2015/0205964 A1 | 7/2015 | Eytan et al. | |

OTHER PUBLICATIONS

Bou-Harb et al., "Inferring internet-scale infections by correlating malware and probing activities," 2014 IEEE International Conference on Communications (ICC) Year: 2014 pp. 640-646.*

Chamorro et al., "The Design and Implementation of an Antivirus Software Advising System," 2012 Ninth International Conference on Information Technology—New Generations, Year: 2012, pp. 612-617.

Bou-Harb et al., "Inferring internet-scale infections by correlating malware and probing activities," 2014 IEEE International Conference on Communications (ICC), Year: 2014, pp. 640-646.

International Search Report and Written Opinion received for International App. No. PCT/IB2015/001540, dated Jan. 20, 2016, 7 pages.

Supplementary European Search Report of the European Patent Office, Issued in European Application No. 15796539.3-1870; dated Jul. 27, 2017; 7 pages.

* cited by examiner

TECHNOLOGIES FOR PROTECTING SYSTEMS AND DATA TO PREVENT CYBER-ATTACKS

CROSS REFERENCE TO RELATED APPLICATIONS

The present application is a continuation of U.S. application Ser. No. 14/600,672, entitled "TECHNOLOGIES FOR PROTECTING SYSTEMS AND DATA TO PREVENT CYBER-ATTACKS," filed Jan. 20, 2015, which claims the benefit of U.S. Provisional Application No. 61/929,576, entitled "CYBER-SECURITY SYSTEMS AND METHODS," filed Jan. 21, 2014, each of which is hereby incorporated herein by reference in its entirety.

TECHNICAL FIELD

Embodiments of the technologies described herein relate, in general, to cybersecurity technologies, and in particular to an electronic platform for protecting a network from malware hidden within files imported into or exported from the network.

BACKGROUND

Organizations rely heavily upon their Information Technology (IT) systems and, in particular, the security of the IT systems. One key feature of such systems involves the transfer of files from the organization (export) and to the organization (import). Such files may contain all types of digital data including text, images, video, audio, and the like that may be required by the organization. The importance of such transfers has made them a frequent target for attack by hackers, often with disastrous results for the organization involved. Hackers use the platform of these files in order to infect the IT systems of the organization with malicious code and/or to extract sensitive data from the organization. Malicious code is generally hidden within the files and current security tools like antivirus software are incapable of detecting or preventing such attacks. Antivirus programs and other tools may be effective when responding to discovered and known attacks or viruses, but such programs are poorly suited for detecting malicious code within file platforms. In such platforms, antivirus programs may be alerted only after significant damage has already been done. Additionally, there is typically a gap between the time in which a new threat is identified and the time in which the antivirus programs are updated to protect against the new threat.

BRIEF DESCRIPTION OF THE DRAWINGS

The present disclosure will be more readily understood from a detailed description of some example embodiments taken in conjunction with the following figures in which.

SUMMARY

Figure 1:
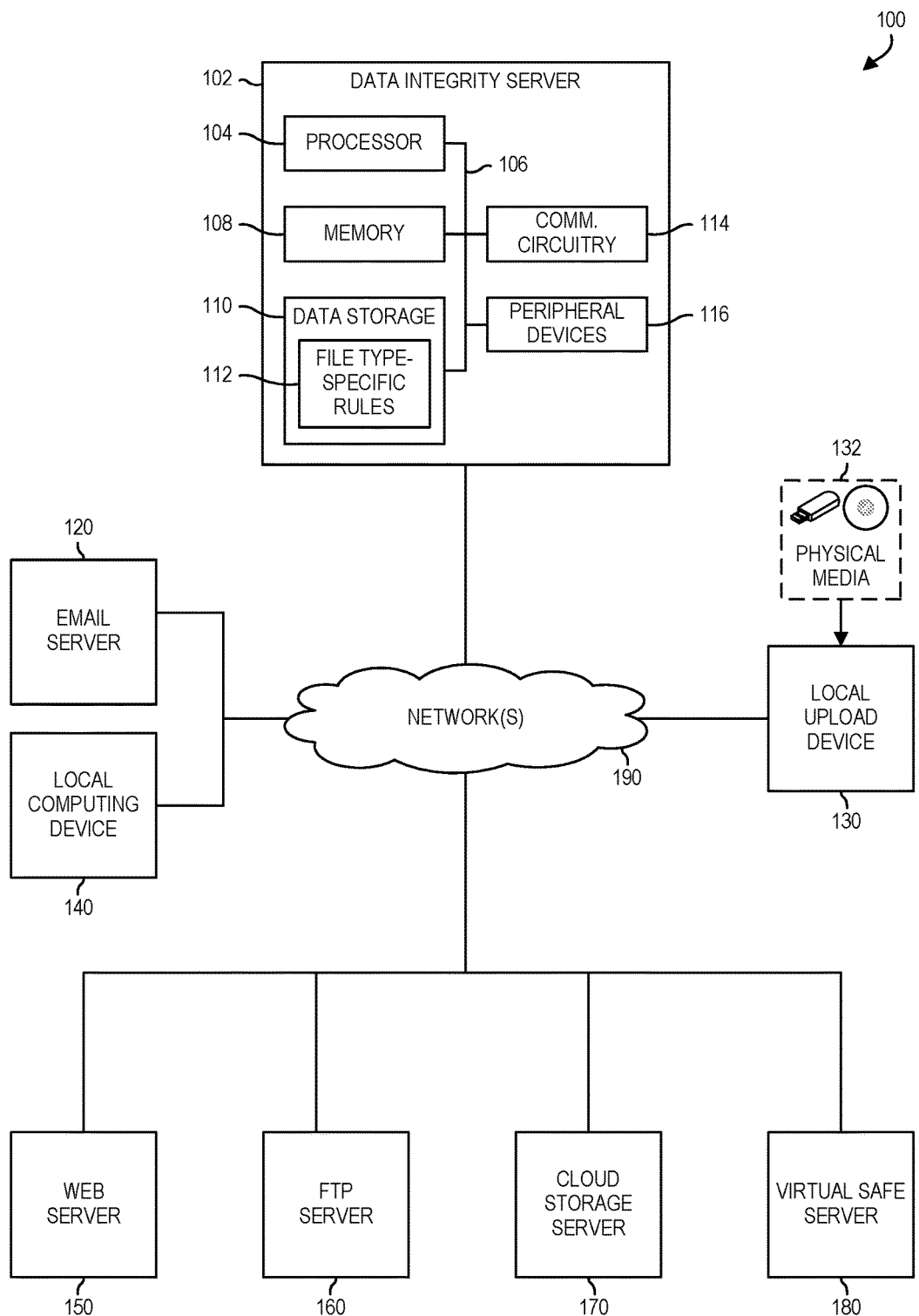
FIG. 1 is a simplified block diagram of at least one embodiment of a system for protecting systems and data of an organization from malware.

A data integrity server for protecting systems and data includes a malware detection module configured to receive a data file for import from an external source, analyze the received data file with a plurality of anti-malware engines, determine whether the received data file includes malware based on the analysis, and discard the received data file in response to a determination that the received file includes malware. The data integrity server further includes a file type verification module configured to verify, in response to a determination that the received file does not include malware, the file type of the received data file based at least in part on the file extension associated with the received data file. Additionally, the data integrity server also includes a file sterilization module configured to clean the received data file in response to a verification of the file type of the received data file and transmit the cleaned data file to a computing device for import of the cleaned data file.

In an embodiment, to clean the received data file includes to transform the received file as a function of a file type-specific rule, wherein the file type-specific rule maintains a file format of the received data file and renders malware hidden within the received data file benign. In such an embodiment, the file type-specific rule may further modify a characteristic of the received data file. The characteristic of the received data file may include a structure, a format, or header information corresponding to the received data file.

In an embodiment, the malware detection module is further configured to determine whether the received data file can be cleaned in response to a determination that the received file includes malware. In such an embodiment, to discard the received data file in response to a determination that the received file includes malware includes to discard the received data file in response to a determination that the received data file cannot be cleaned. Additionally, the file type verification module may further be configured to verify, in response to a determination that the received data file can be cleaned, the file type of the received data file based at least in part on the file extension associated with the received data file.

In another embodiment, to receive the data file for import from the external source includes to one of receive an email message that includes the data file for import as an attachment, receive the data file for import from an agent of a local computing device, receive the data file for import from a physical storage media, receive the data file for import as a download from a website, receive the data file for import from a storage cloud, receive the data file for import from a virtual safe, or receive the data file for import from a file transfer protocol session. Additionally, the external source may include one of an email server, a local upload device, a local computing device, a web server, a file transfer protocol server, a cloud storage server, or a virtual safe server. Additionally, in an embodiment, to verify the file type of the received data file based at least in part on the file extension associated with the received data file includes to process the received file in a sandbox and monitor the behavior of the received data file during processing.

In another embodiment, to receive the data file for import from the external source includes to receive a batch of data files for import from the external source, to analyze the received data file with the plurality of anti-malware engines includes to analyze each data file of the batch of data files with a plurality of anti-malware engines, and to determine whether the received data file includes malware includes to determine whether each data file of the batch includes malware based on the analysis. In an embodiment, to discard the received data file includes to discard each data file of the batch in response to a determination that one or more of the data files of the batch includes malware. In another embodiment, to discard the received data file includes to discard each data file in the batch determined to include malware. Additionally, in another embodiment, to discard the received data file includes to determine whether each data file in the batch determined to include malware can be cleaned and discard each data file of the batch in response to a determination that one or more of the data files determined to include malware cannot be cleaned.

One or more machine-readable storage media include a plurality of instructions stored thereon that in response to being executed by a data integrity server, cause the data integrity server to receive a data file for import from an external source, analyze the received data file with a plurality of anti-malware engines, determine whether the received data file includes malware based on the analysis, and discard the received data file in response to a determination that the received file includes malware. The plurality of instructions further cause the data integrity server to verify, in response to a determination that the received file does not include malware, the file type of the received data file based at least in part on the file extension associated with the received data file and clean the received data file in response to a verification of the file type of the received data file. Additionally, the plurality of instructions further cause the data integrity server to transmit the cleaned data file to a computing device for import of the cleaned data file.

In an embodiment, to clean the received data file includes to transform the received file as a function of a file type-specific rule, wherein the file type-specific rule maintains a file format of the received data file and renders malware hidden within the received data file benign. In such an embodiment, the file type-specific rule may further modify a characteristic of the received data file.

Additionally, in an embodiment, the plurality of instructions may further cause the data integrity server to determine whether the received data file can be cleaned in response to a determination that the received file includes malware. In such an embodiment, to discard the received data file in response to a determination that the received file includes malware includes to discard the received data file in response to a determination that the received data file cannot be cleaned. In another embodiment, to verify the file type of the received data file based at least in part on the file extension associated with the received data file includes to process the received file in a sandbox and monitor the behavior of the received data file during processing.

A method for protecting systems and data includes receiving, by a data integrity server, a data file for import from an external source. The method further includes analyzing, by the data integrity server, the received data file with a plurality of anti-malware engines and determining, by the data integrity server, whether the received data file includes malware based on the analysis. Additionally, the method includes discarding, by the data integrity server, the received data file in response to determining that the received file includes malware. The method further includes verifying, by the data integrity server and in response to determining that the received file does not include malware, the file type of the received data file based at least in part on the file extension associated with the received data file. Additionally, the method further includes cleaning, by the data integrity server, the received data file in response to verifying the file type of the received data file and transmitting, by the data integrity server, the cleaned data file to a computing device for import of the cleaned data file.

In an embodiment, cleaning the received data file includes transforming the received file as a function of a file type-specific rule, wherein the file type-specific rule maintains a file format of the received data file and renders malware hidden within the received data file benign. In such an embodiment, the file type-specific rule may further modify a characteristic of the received data file. In another embodiment, verifying the file type of the received data file based at least in part on the file extension associated with the received data file includes processing the received file in a sandbox and monitoring the behavior of the received data file during processing.

DETAILED DESCRIPTION

Various non-limiting embodiments of the present disclosure will now be described to provide an overall understanding of the principles of the structure, function, and use of systems and methods disclosed herein. One or more examples of these non-limiting embodiments are illustrated in the selected examples disclosed and described in detail with reference made to FIGS. 1-4 in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. In addition, elements illustrated in the figures are not necessarily drawn to scale for simplicity and clarity of illustration. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment", or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

Referring now to FIG. 1, in one embodiment, a system 100 for protecting an organization's systems and data from malware includes a data integrity server 102 configured to communicate with an email server 120, a local upload device 130, a local computing device 140, a web server 150, a File Transfer Protocol (FTP) server 160, a cloud storage server 170, and a virtual safe server 180 over one or more networks 190. It should be appreciated that although the data integrity server 102 of the illustrative embodiment protects an organization's systems and data from malware, the data integrity server 102 may also protect any other entity's systems and data from malware. For example, in some embodiments, the data integrity server 102 may also be configured to protect an individual user's or a homeowner's systems and data from malware.

In operation, the data integrity server 102 eliminates various types of malicious code or malware (e.g., viruses, spyware, adware, nagware, worms, Trojans, etc.) hidden inside of data files being imported into and exported from an organization's systems or networks. The data integrity server 102 eliminates previously known types of malware as well as types of malware that have not yet been identified by cybersecurity professionals. To do so, the data integrity server 102 receives or intercepts data files (or information) prior to such data files being permitted to be imported into or exported from an organization's systems or network(s) 190. Subsequently, the data integrity server 102 analyzes the data file with multiple anti-malware engines to determine whether the data file includes any known hidden malware. The data integrity server 102 may discard or take other preventative actions in response to one or more of the anti-malware engines determining that the data file includes a known type of hidden malware. Additionally, in response to one or more of the anti-malware engines determining that the data file does not include a known type of hidden malware, the data integrity server 102 verifies the type of the data file based at least in part on, or otherwise as a function of, the extension of the data file. To do so, in some embodiments, the data integrity server 102 processes or otherwise executes the data file in a sandbox (or other virtual environment) and monitors for suspicious behavior. If the data integrity server 102 is unable to verify the type of the data file based on the extension, the data integrity server 102 may discard or take other preventative actions. In embodiments in which the data integrity server 102 is able to verify the type of the data file based on the extension, the data integrity server 102 may sanitize or clean the data file to eliminate any unknown or hidden malware. To do so, in some embodiments, the data integrity server 102 transforms and/or reformats the data file according to one or more file type-specific rules to render any unknown or hidden malware inoperable or benign. After cleaning the data file, the data integrity server 102 transmits the data file to the originally intended destination (e.g., a local file server, a workstation computing device, a local or remote email server, a local or remote web server, etc.), which may be located internally or externally to the organization. In that way, both known and unknown malware threats embedded within data files may be detected and/or eliminated prior to such data files being introduced into or exported from an organization's systems or network(s) 190.

The data integrity server 102 may be embodied as any type of server or computing device capable of processing, communicating, storing, maintaining, and transferring data. For example, the data integrity server 102 may be embodied as a server, a microcomputer, a minicomputer, a mainframe, a desktop computer, a laptop computer, a mobile computing device, a handheld computer, a smart phone, a tablet computer, a personal digital assistant, a telephony device, a custom chip, an embedded processing device, or other computing device and/or suitable programmable device. In some embodiments, the data integrity server 102 may be embodied as a computing device integrated with other systems or subsystems. In the illustrative embodiment of FIG. 1, the data integrity server 102 includes a processor 104, a system bus 106, a memory 108, a data storage 110, communication circuitry 114, and one or more peripheral devices 116. Of course, the data integrity server 102 may include other or additional components, such as those commonly found in a server and/or computer (e.g., various input/output devices), in other embodiments. Additionally, in some embodiments, one or more of the illustrative components may be incorporated in, or otherwise from a portion of, another component. For example, the memory 108, or portions thereof, may be incorporated in the processor 104 in some embodiments. Furthermore, it should be appreciated that the data integrity server 102 may include other components, sub-components, and devices commonly found in a computer and/or computing device, which are not illustrated in FIG. 1 for clarity of the description.

The processor 104 may be embodied as any type of processor capable of performing the functions described herein. For example, the processor 104 may be embodied as a single or multi-core processor, a digital signal processor, microcontroller, a general purpose central processing unit (CPU), a reduced instruction set computer (RISC) processor, a processor having a pipeline, a complex instruction set computer (CISC) processor, an application specific integrated circuit (ASIC), a programmable logic device (PLD), a field programmable gate array (FPGA), or other processor or processing/controlling circuit or controller.

In various configurations, the data integrity server 102 includes a system bus 106 for interconnecting the various components of the data integrity server 102. The system bus 106 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations with the processor 104, the memory 108, and other components of the data integrity server 102. In some embodiments, the data integrity server 102 can be integrated into one or more chips such as a programmable logic device or an application specific integrated circuit (ASIC). In such embodiments, the system bus 106 may form a portion of a system-on-a-chip (SoC) and be incorporated, along with the processor 104, the memory 108, and other components of the data integrity server 102, on a single integrated circuit chip.

The memory 108 may be embodied as any type of volatile or non-volatile memory or data storage capable of performing the functions described herein. For example, the memory 108 may be embodied as read only memory (ROM), random access memory (RAM), cache memory associated with the processor 104, or other memories such as dynamic RAM (DRAM), static ram (SRAM), programmable ROM (PROM), electrically erasable PROM (EEPROM), flash memory, a removable memory card or disk, a solid state drive, and so forth. In operation, the memory 108 may store various data and software used during operation of the data integrity server 102 such as operating systems, applications, programs, libraries, and drivers.

The data storage 110 may be embodied as any type of device or devices configured for short-term or long-term storage of data such as, for example, memory devices and circuits, memory cards, hard disk drives, solid-state drives, or other data storage devices. For example, in some embodiments, the data storage 110 includes storage media such as a storage device that can be configured to have multiple modules, such as magnetic disk drives, floppy drives, tape drives, hard drives, optical drives and media, magneto-optical drives and media, compact disk drives, Compact Disc Read Only Memory (CD-ROM), Compact Disc Recordable (CD-R), Compact Disc Rewriteable (CD-RW), a suitable type of Digital Versatile Disc (DVD) or Blu-Ray disk, and so forth. Storage media such as flash drives, solid state hard drives, redundant array of individual disks (RAID), virtual drives, networked drives and other memory means including storage media on the processor 104, or the memory 108 are also contemplated as storage devices. It should be appreciated that such memory can be internal or external with respect to operation of the disclosed embodiments. It should also be appreciated that certain portions of the processes described herein can be performed using instructions stored on a computer-readable medium or media that direct or otherwise instruct a computer system to perform the process steps. Non-transitory computer-readable media, as used herein, comprises all computer-readable media except for transitory, propagating signals.

In some embodiments, the data storage 110 includes file type-specific rules 112. Each of the file type-specific rules 112 may correspond to a specific file type and may be configured to transform and/or reformat data files of the same file type. In some embodiments, one or more of the file type-specific rules 112 may be configured to transform and/or reformat received data files of the same file type without changing critical underlying features of the received data files. To do so, one or more of the file type-specific rules 112 may be configured to change or modify a characteristic (e.g., structure, format, header information, etc.) of a received data file in such a way that malicious code hidden within the data file is rendered benign but the original file format is retained and minimal degradation of the quality of the data file occurs. In a specific example, one or more of the file type-specific rules 112 may be configured to modify an image characteristic (e.g., an image size or resolution, a file size, a level of quality, a type of encoding, etc.) of a received image and thereby generate a new image of the same type and being substantially similar in quality when rendered or processed.

In another specific example, one or more of the file type-specific rules 112 may be configured to convert each page (or a portion thereof) of a portable document format (PDF) into an image and then modify a characteristic of the image such that a new image is generated being substantially similar in quality when rendered or processed. In yet another specific example, one or more of the file type-specific rules 112 may be configured to modify a characteristic corresponding to each embedded object of a multi-object document in series or in parallel. For example, the one or more file type-specific rules 112 may be configured to modify an image characteristic of an image included with a document, a text characteristic of a text block included within the document, an audio characteristic of an audio clip included within the document, and a video characteristic of a video clip included within the document. In such examples, the file type-specific rules 112 may be configured to reconstruct the document and thereby eliminate any malware hidden therein. It should be appreciated that the file type-specific rules 112 may be configured to transform and/or reformat any type of file (or embedded object) by modifying any suitable characteristic. Additionally, in some embodiments, one or more of the file type-specific rules 112 may be embodied as mathematical algorithms configured to transform and/or reformat received data files (or objects embedded within received data files).

The communication circuitry 114 of the data integrity server 102 may be embodied as any type of communication circuit, device, interface, or collection thereof, capable of enabling communications between the data integrity server 102 and the email server 120, local upload device 130, local computing device 140, web server 150, FTP server 160, cloud storage server 170, virtual safe server 180, and/or other computing devices. For example, the communication circuitry 114 may be embodied as one or more network interface controllers (NICs), in some embodiments. The communication circuitry 114 may be configured to use any one or more communication technologies (e.g., wireless or wired communications) and associated protocols (e.g., Ethernet, Wi-Fi®, WiMAX, etc.) to effect such communication.

In some embodiments, the data integrity server 102 and the email server 120, local upload device 130, local computing device 140, web server 150, FTP server 160, cloud storage server 170, virtual safe server 180, and/or other computing devices may communicate with each other over the network(s) 190. The network(s) 190 may be embodied as any number of various wired and/or wireless communication networks. For example, the network(s) 190 may be embodied as or otherwise include a local area network (LAN), a wide area network (WAN), a cellular network, or a publicly-accessible, global network such as the Internet. Additionally, the network(s) 190 may include any number of additional devices to facilitate communication between the data integrity server 102, email server 120, local upload device 130, local computing device 140, web server 150, FTP server 160, cloud storage server 170, virtual safe server 180, and/or other computing devices.

Additionally, in some embodiments, the data integrity server 102 may further include one or more peripheral devices 116. Such peripheral devices 116 may include any type of peripheral device commonly found in a computing device such as additional data storage, speakers, a hardware keyboard, a keypad, a gesture or graphical input device, a motion input device, a touchscreen interface, one or more displays, an audio unit, a voice recognition unit, a vibratory device, a computer mouse, a peripheral communication device, and any other suitable user interface, input/output device, and/or other peripheral device.

The email server 120 may be embodied as any type of computing device capable of performing the functions described herein. For example, the email server 120 may be embodied as a server, a microcomputer, a minicomputer, a mainframe, a desktop computer, a laptop computer, a custom chip, an embedded processing device, or other computing device and/or suitable programmable device. As such, the email server 120 may include devices and structures commonly found in a computing device such as processors, memory devices, communication circuitry, and data storages, which are not shown in FIG. 1 for clarity of the description. In some embodiments, the email server 120 may be local to the organization (e.g., communicatively coupled to the network(s) 190 of the organization and/or administered by the organization). Additionally or alternatively, the email server 120 may be remote to the organization (e.g., communicatively coupled to the Internet, administered by an entity external to the organization, etc.). In some embodiments, the email server 120 is configured to send and receive email messages to and from users, both internal and external to the organization. Additionally or alternatively, the email server 120 may be configured to relay email messages on behalf of users or other entities.

In the illustrative embodiment, the email server 120 is configured to intercept and transmit email messages and attachments (e.g., data files and other electronic information) to the data integrity server 102 prior to delivery to an intended recipient. As discussed in more detail below, the data integrity server 102 analyzes and sanitizes (e.g., cleans) the email messages and attachments. After analysis and sanitization by the data integrity server 102, the email server 120 is configured to transmit, relay, and/or deliver the email messages and attachments to the intended recipient, which may be internal or external to the organization. Additionally or alternatively, in some embodiments, the email server 120 may be configured to operate as a mail relay server. In such embodiments, the email server 120 may be configured to intercept and transmit email messages and attachments (e.g., data files and other electronic information) to the data integrity server 102, which may subsequently transmit the analyzed and sanitized email messages to another email server 120 for transmission and/or delivery to the intended recipient. In this manner, the organization can control the import of email messages and attachments (e.g., data files) that may contain malware.

The local upload device 130 may be embodied as any type of computing device capable of performing the functions described herein. For example, the local upload device 130 may be embodied as a server, a kiosk, a workstation, a microcomputer, a minicomputer, a mainframe, a desktop computer, a laptop computer, a mobile computing device, a handheld computer, a smart phone, a tablet computer, a personal digital assistant, a telephony device, a custom chip, an embedded processing device, or other computing device and/or suitable programmable device. As such, the local upload device 130 may include devices and structures commonly found in a computing device such as processors, memory devices, communication circuitry, and data storages, which are not shown in FIG. 1 for clarity of the description. In the illustrative embodiment, the local upload device 130 is configured to protect organizations from data files entering through physical storage media 132 or memory devices such as, for example, compact discs (CDs), digital versatile discs (DVDs), memory sticks, portable hard drives, and other such devices and detachable storage media. In some embodiments, an organization may require employees to utilize the local upload device 130 to import any data files originating from a physical storage media 132 or memory device into the organization's systems and network(s) 190. In such embodiments, the local upload device 130 may be configured to intercept data files prior to those data files being introduced into the organization's systems and network(s) 190. Intercepted data files may be sent to the data integrity server 102 to be processed as discussed in more detail below. In this manner, the organization can control the import of data files from physical storage media 132 or a memory device that may contain malware.

In some embodiments, the local upload device 130 may be embodied as a hardened computing system to prevent users (e.g., employees, malicious actors, etc.) from circumventing the data file import mechanisms described above. For example, in some embodiments, the functionality of the local upload device 130 may be managed by an operating system or system image executed from a bootable CD or DVD. It should be appreciated that the operating system and/or system image may be executed from any other bootable type of read-only memory or storage device.

The local computing device 140 may be embodied as any type of computing device capable of performing the functions described herein. For example, the local computing device 140 may be embodied as a workstation, a desktop computer, a laptop computer, a mobile computing device, a handheld computer, a smart phone, a tablet computer, a personal digital assistant, a telephony device, a microcomputer, a minicomputer, a server, a kiosk, a mainframe, a custom chip, an embedded processing device, or other computing device and/or suitable programmable device. As such, the local computing device 140 may include devices and structures commonly found in a computing device such as processors, memory devices, communication circuitry, and data storages, which are not shown in FIG. 1 for clarity of the description. In some embodiments, the local computing device 140 may execute a security agent. The security agent may be configured to prevent users (e.g., employees, etc.) from importing data files via physical memory devices 132 or storage media (e.g., CDs, DVDs, memory sticks, portable hard drives, detachable storage media, etc.) inserted into an optical drive or communicatively coupled to a communication interface (e.g., a USB interface, an eSATA interface, a PCIe interface, etc.) of the local computing device 140. Alternatively, the security agent may be configured to intercept data files exported via physical memory devices 132 or storage media inserted into an optical drive or communicatively coupled to a communication interface of the local computing device 140. The security agent may send the intercepted data files to the data integrity server 102 to be processed. In this manner, the organization can also control the import and export of data files to/from a physical device or storage media inserted into and/or communicatively coupled to the local computing device 140.

The web server 150 may be embodied as any type of computing device capable of performing the functions described herein. For example, the web server 150 may be embodied as a server, a microcomputer, a minicomputer, a mainframe, a desktop computer, a laptop computer, a custom chip, an embedded processing device, or other computing device and/or suitable programmable device. As such, the web server 150 may include devices and structures commonly found in a computing device such as processors, memory devices, communication circuitry, and data storages, which are not shown in FIG. 1 for clarity of the description. The web server 150 may be local to the organization or it may be remote to the organization. In the illustrative embodiment, the web server 150 is configured to protect against malware associated with websites or the internet. In some embodiments, the web server 150 is configured to intercept data files attempting to enter the organization's systems or network(s) 190 through a website, the Internet, an extranet, and/or any other network, system, or electronic source. For example, the web server 150 may be configured to intercept a data file attempting to be downloaded by an employee of the organization. In such embodiments, the web server 150 transmits the intercepted data files to the data integrity server 102 for processing as discussed in more detailed below. After the data file has been processed by the data integrity server 102, it may be permitted to be imported into one or more systems or network(s) 190 of the organization. In this manner, the organization can control the import (or export) of data files downloaded (or uploaded) via a remote website.

The File Transfer Protocol (FTP) server 160 may be embodied as any type of computing device capable of performing the functions described herein. For example, the FTP server 160 may be embodied as a server, a microcomputer, a minicomputer, a mainframe, a desktop computer, a laptop computer, a custom chip, an embedded processing device, or other computing device and/or suitable programmable device. As such, the FTP server 160 may include devices and structures commonly found in a computing device such as processors, memory devices, communication circuitry, and data storages, which are not shown in FIG. 1 for clarity of the description. The FTP server 160 may be local to the organization or it may be remote to the organization. In the illustrative embodiment, the FTP server 160 is configured to protect against malware associated data files transferred via FTP connections and/or sessions. In some embodiments, the FTP server 160 is configured to intercept data files attempting to enter the organization's systems or network(s) 190 through an FTP connection or session. For example, the FTP server 160 may be configured to intercept a data file attempting to be downloaded by an employee of the organization via an FTP connection with a remote system. In such embodiments, the FTP server 160 transmits the intercepted data files to the data integrity server 102 for processing as discussed in more detailed below. After the data file has been processed by the data integrity server 102, it may be permitted to be imported into one or more systems or network(s) 190 of the organization. In this manner, the organization can control the import (or export) of data files downloaded (or uploaded) via FTP connections and/or sessions.

The cloud storage server 170 may be embodied as any type of computing device capable of performing the functions described herein. For example, the cloud storage server 170 may be embodied as a server, a microcomputer, a minicomputer, a mainframe, a desktop computer, a laptop computer, a custom chip, an embedded processing device, or other computing device and/or suitable programmable device. As such, the cloud storage server 170 may include devices and structures commonly found in a computing device such as processors, memory devices, communication circuitry, and data storages, which are not shown in FIG. 1 for clarity of the description. The cloud storage server 170 may include data storage (e.g., a single data storage, multiple data storages, or a virtualized pool of data storage) to which data files (e.g., digital documents, digital videos, digital photographs, digital music, system backups, virtual machine images, etc.) of a user may be stored and later accessed. In the illustrative embodiment, data files downloaded from or uploaded to the cloud storage server 170 may be intercepted and processed by the data integrity server 102. After the data files have been processed by the data integrity server 102, they may be permitted to be imported into or exported from one or more systems or network(s) 190 of the organization. In this way, the organization can control the import (or export) of data files downloaded (or uploaded) via the cloud storage server 170.

The virtual safe server 180 may be embodied as any type of computing device capable of performing the functions described herein. For example, the virtual safe server 180 may be embodied as a server, a microcomputer, a minicomputer, a mainframe, a desktop computer, a laptop computer, a custom chip, an embedded processing device, or other computing device and/or suitable programmable device. As such, the virtual safe server 180 may include devices and structures commonly found in a computing device such as processors, memory devices, communication circuitry, and data storages, which are not shown in FIG. 1 for clarity of the description. The virtual safe server 180 may be configured to manage one or more virtual safes that facilitate the encrypted and secure transfer of data files both into and out of the systems or network(s) 190 of the organization. In some embodiments, data files that are to be securely transferred from the organization via a virtual safe are intercepted and transmitted to the data integrity server 102 for processing prior to encryption. In some embodiments, a dedicated server (not shown) may be configured to monitor communications between the systems and network(s) 190 of the organization for files and intercept data files that are to be securely transferred from the organization via a virtual safe. In other embodiments, one or more virtual safe agents may be executed by systems or devices (e.g., the local computing device 140, the email server 120, the local upload device 130, the web server 150, the FTP server 160, etc.) of the organization. In such embodiments, the virtual safe agent(s) may intercept the data files that are to be securely transferred from the organization via the virtual safe. After the data files have been processed by the data integrity server 102, they may be permitted to be encrypted and securely transferred from the organization via the virtual safe. In this way, the organization can control the export (or import) of data files securely transferred via virtual safes.

Figure 2:
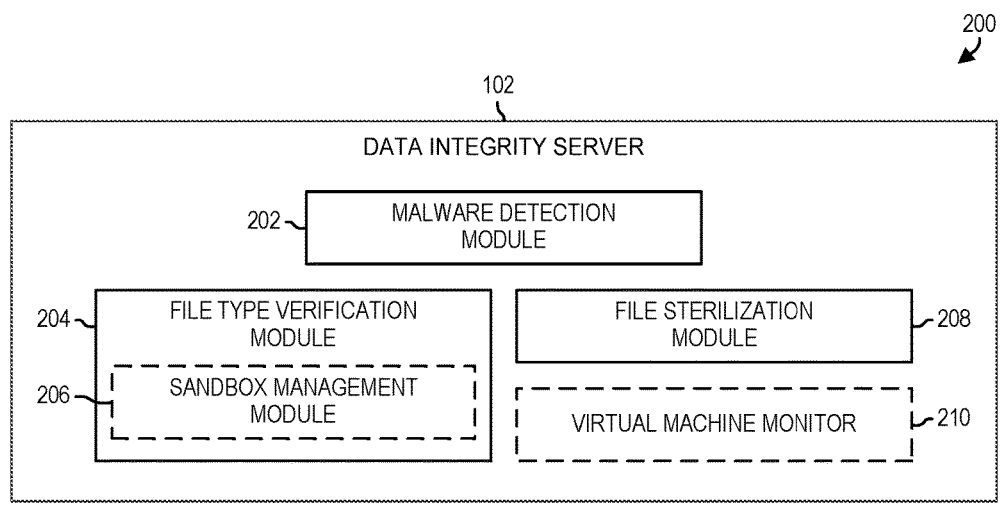
FIG. 2 is a simplified block diagram of at least one embodiment of an environment that may be executed by the data integrity server of FIG. 1.

Referring now to FIG. 2, in the illustrative embodiment, the data integrity server 102 establishes an environment 200 during operation. The illustrative embodiment 200 includes a malware detection module 202, a file type verification module 204, and a file sterilization module 208. In some embodiments, the environment 200 may also include a virtual machine monitor 210 as discussed in more detail below. Additionally, in some embodiments, the file type verification module 204 may include a sandbox management module 206. The various modules of the environment 200 may be embodied as hardware, firmware, software, or a combination thereof. For example, each of the modules of the environment 200 may be embodied as a processor and/or a controller configured to provide the functionality described below. Of course, it should be appreciated that the data integrity server 102 may include other components, subcomponents, modules, and devices commonly found in a computing device, which are not illustrated in FIG. 2 for clarity of the description.

The malware detection module 202 is configured to analyze data files with multiple anti-malware engines to determine whether the data files include any known hidden malware. For example, in some embodiments, the malware detection module 202 may analyze received data files with two or more, or three or more, anti-malware engines. In a specific embodiment, the malware detection module 202 may analyze received data files with five different anti-malware engines. Each of the anti-malware engines may be embodied as any type of anti-malware or anti-virus engine configured to detect various types of malicious code or malware (e.g., viruses, spyware, adware, nagware, worms, Trojans, etc.) hidden within the data file or a batch of data files. In some embodiments, each of the anti-malware engines may be updated periodically to ensure that newly discovered malware can be detected. In some embodiments, the anti-malware engines may each notify the malware detection module 202 whether malware was detected within the received data files.

In some embodiments, the malware detection module 202 is also configured to discard or take other preventative action in response to one or more of the anti-malware engines determining that a received data file includes a known type of malware. For example, the malware detection module 202 may discard the infected file in response to one or more of the anti-malware engines determining that the data file includes a known type of malware (hidden or otherwise). In another example, the malware detection module 202 may be configured to determine whether the data file is able to be cleaned. In some embodiments, the malware detection module 202 may determine whether the infected data file may be cleaned by one or more of the anti-malware engines. In other embodiments, the malware detection module 202 may determine whether it may clean the infected data file. In embodiments in which the malware detection module 202 determines that the infected data file cannot be cleaned, the malware detection module 202 may discard the infected data file.

The file type verification module 204 is configured to verify the type of a received data file based at least in part on, or otherwise as a function of, the extension of the file. To do so, the file type verification module 204 may be configured to verify that the characteristics (e.g., structure, format, header information, etc.) of the received data file correspond to reference characteristics of a data file having the same file extension. For example, in embodiments in which the received data file is associated with a ".jpg" file extension, the file type verification module 204 may verify that the characteristics of the received data file correspond to the anticipated characteristics of an image file having the same file extension. In doing so, the file type verification module 204 verifies that the data file is what it claims to be based on the associated file extension. It should be appreciated that the file type verification module 204 may utilize any suitable mechanism for verifying that the actual type of the received data file corresponds to the type of data file anticipated based on the file extension. In some embodiments, the file type verification module 204 discards the received data file or takes other preventative actions in response to determining that the type of the received data file cannot be verified.

Additionally, in some embodiment, the file type verification module 204 may also be configured to securely process the received data file to facilitate verification. To do so, in some embodiments, the file type verification module 204 includes the sandbox management module 206. The sandbox management module 206 is configured to execute, open, render, and/or process the received data file in a sandbox (e.g., a virtual environment, an isolated environment, etc.). In such embodiments, the sandbox management module 206 may monitor the behavior of the data file while it is processed in the sandbox. In some embodiments, the sandbox management module 206 may be configured to monitor for anticipated behavior of the data file based on the extension associated with the data file. Such monitoring may be used by the file type verification module 204 to facilitate verifying the type of the received data file based on the associated extension. Additionally or alternatively, the sandbox management module 206 may be configured to monitor for suspicious behavior while the data file is being processed in the sandbox. Such monitoring may be used by the file type verification module 204 to facilitate determining whether the received data file includes malware.

The file sterilization module 208 is configured to sterilize or clean data files to eliminate any unknown or hidden malware. To do so, in some embodiments, the file sterilization module 208 transforms and/or reformats the data file based on one or more file type-specific rules 112 in such a way that malicious code hidden within the data file is rendered benign but the original file format is retained and minimal degradation of the quality of the data file occurs. As discussed, in some embodiments, one or more of the file type-specific rules 112 may be configured to change or modify a characteristic (e.g., structure, format, header information, etc.) of a received data file. It should be appreciated that the file type-specific rules 112 may be configured to transform and/or reformat any type of file (or embedded object) by modifying any suitable characteristic. Additionally, in some embodiments, one or more of the file type-specific rules 112 may be embodied as mathematical algorithms, which when executed by the file sterilization module 208, transform and/or reformat received data files (or objects embedded within received data files).

As discussed, in some embodiments, the environment 200 may include the virtual machine monitor (VMM) module 210 (or hypervisor). In such embodiments, the VMM module 210 may be configured to facilitate and manage the virtualization of the physical resources of the data integrity server 102. In some embodiments, the VMM module 210 may initialize and execute multiple guest operating systems and/or virtual environments in which data files may be processed. For example, in some embodiments, the VMM module 210 may initialize and execute a separate virtual machine or environment for each sandbox required. Additionally or alternatively, the VMM module 210 may initialize and execute a separate virtual machine for each level of processing performed on a data file or a batch of data files (e.g., anti-malware engine processing, file type verification processing, file sterilization processing, etc.).

Figure 3:
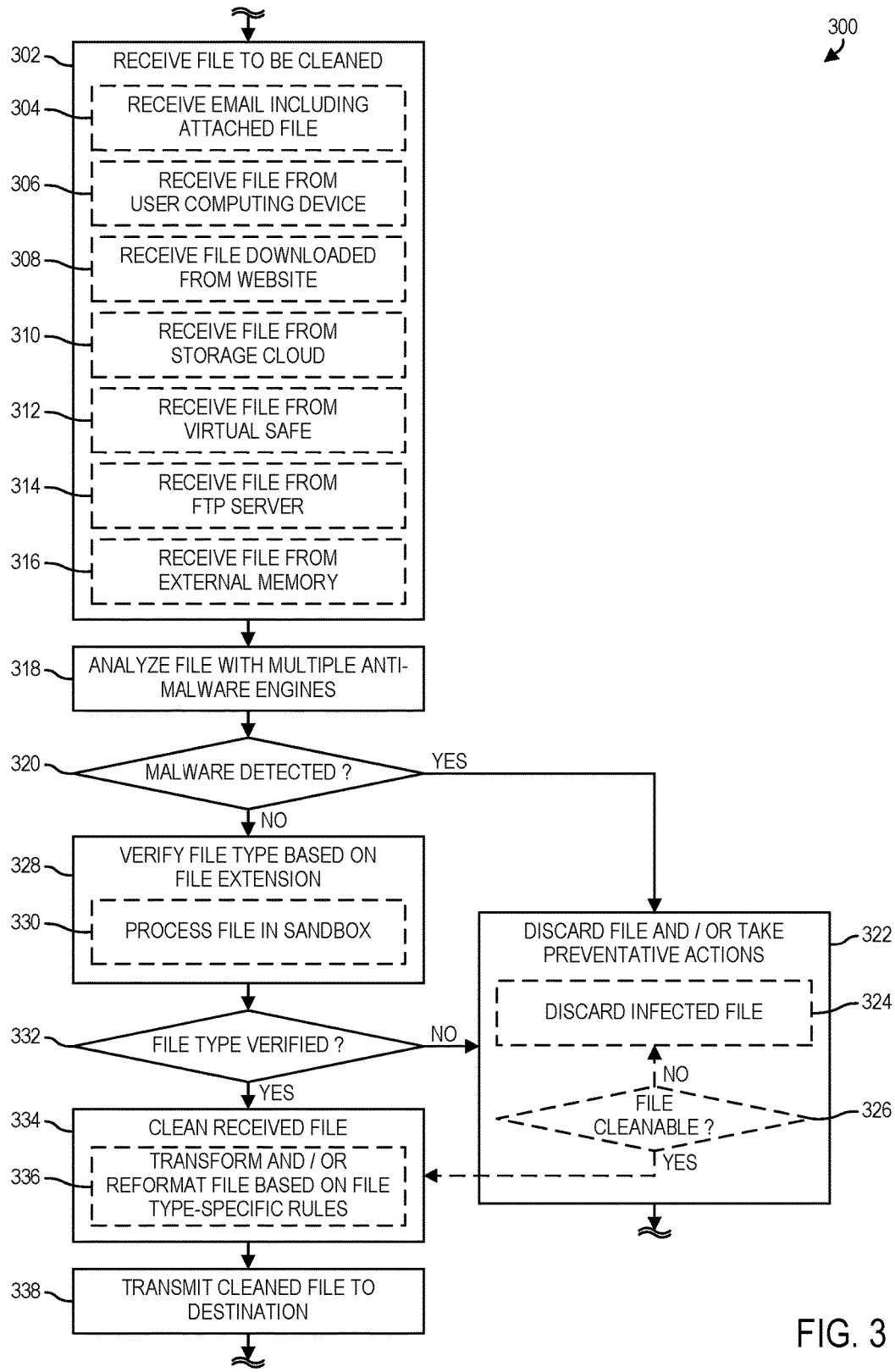
FIG. 3 is a simplified flow diagram of at least one embodiment of a method for protecting systems and data of an organization from malware that may be executed by the data integrity server of FIGS. 1 and 2.

Referring now to FIG. 3, a method 300 for protecting systems and data of an organization from malware that may be executed by the data integrity server 102 begins with block 302. In block 302, the data integrity server 102 receives a data file to be cleaned (or sterilized). The data integrity server 102 may receive the data file to be cleaned via any one of various different input sources. For example, in block 304, the data integrity server 102 may receive an email message from the email server 120 including the data file as an attachment. In another example, in block 306, the data integrity server 102 may receive the data file from a user's computing device such as, for example, the local computing device 140. In yet another example, in block 308, the data integrity server 102 may receive the data file to be cleaned via website download. In block 310, the data integrity server 102 may also receive the data file to be cleaned from a storage cloud via the cloud storage server 170. In another example, in block 312, the data integrity server 102 may receive the data file from a virtual safe via the virtual safe server 180. Additionally or alternatively, the data integrity server 102 may intercept a data file that is to be uploaded to a virtual safe prior to encryption. In some examples, in block 314, the data integrity server 102 may receive the data file to be cleaned from the FTP server 160. In other examples, in block 316, the data integrity server 102 may also receive the data file from physical memory devices 132, external memory, or storage media inserted into an optical drive or communicatively coupled to a communication interface of the local upload device 130 or the local computing device 140.

In block 318, the data integrity server 102 analyzes the data file with multiple anti-malware engines to determine whether the data file includes any known malware (hidden or otherwise). For example, in some embodiments, the data integrity server 102 may analyze the data file with two or more, or three or more, anti-malware engines. In a specific embodiment, the data integrity server 102 analyzes the data file with five different anti-malware engines. Each of the anti-malware engines may be embodied as any type of anti-malware or anti-virus engine configured to detect various types of malicious code or malware (e.g., viruses, spyware, adware, nagware, worms, Trojans, etc.) hidden within the data file. In some embodiments, each of the anti-malware engines may be updated periodically to ensure that newly discovered malware can be detected. In some embodiments, the anti-malware engines may each notify the data integrity server 102 whether malware was detected within the data file. The method 300 then advances to decision block 320. If, in decision block 320, the data integrity server 102 determines that one or more of the anti-malware engines detected malware within the received data file, the method 300 advances to block 322.

In block 322, the data integrity server 102 discards or takes other preventative actions in response to one or more of the anti-malware engines determining that the data file includes a known type of hidden malware. For example, in block 324, the data integrity server 102 discards the infected file in response to one or more of the anti-malware engines determining that the data file includes a known type of hidden malware. In another example, in decision block 326, the data integrity server 102 determines whether the data file is able to be cleaned. In some embodiments, the data integrity server 102 may determine whether the infected data file may be cleaned by one or more of the anti-malware engines. In other embodiments, the data integrity server 102 may determine whether it may clean the infected data file. If, in decision block 326, the data integrity server 102 determines that the infected file may be cleaned, the method 300 advances to block 334. If, however, the data integrity server 102 determines in decision block 326 that the file cannot be cleaned, the method 300 advances instead to block 324 in which the data integrity server 102 discards the infected file.

Referring back to decision block 320, if the data integrity server 102 determines instead that none of the anti-malware engines (or at least a threshold or reference number of the anti-malware engines) detected malware within the received data file, the method advances to block 328. In block 328, the data integrity server 102 verifies the type of the data file based at least in part on, or otherwise as a function of, the extension of the file. To do so, the data integrity server 102 may verify that the characteristics (e.g., structure, format, header information, etc.) of the data file correspond to reference characteristics of a data file having the same file extension. For example, in embodiments wherein the received data file is associated with a ".jpg" file extension, the data integrity server 102 may verify that the characteristics of the data file correspond to the anticipated characteristics of an image file having the same file extension. In doing so, the data integrity server 102 verifies that the data file is what it claims to be based on the associated file extension. It should be appreciated that the data integrity server 102 may utilize any suitable mechanism for verifying that the actual type of the received data file corresponds to the type of data file anticipated based on the file extension.

In some embodiments, in block 330, the data integrity server 102 may securely process the received data file to facilitate verification. To do so, the data integrity server 102 may execute, open, render, and/or process the data file in a sandbox (e.g., a virtual environment, an isolated environment, etc.). In such embodiments, the data integrity server 102 may monitor the behavior of the data file while it is processed in the sandbox. In some embodiments, the data integrity server 102 may monitor for anticipated behavior of the data file based on the extension associated with the data file. Such monitoring may be used by the data integrity server 102 to facilitate verifying the type of the received data file based on the associated extension. Additionally or alternatively, the data integrity server 102 may monitor for suspicious behavior while the data file is being processed in the sandbox. Such monitoring may be used by the data integrity server 102 to facilitate determining whether the received data file includes malware. The method 300 then advances to decision block 332. If, in decision block 332, the data integrity server 102 determines that the type of the received data file is verified, the method 300 advances to block 334. If, however, the data integrity server 102 determines instead that the type of the received data file is not verified, the method 300 advances to block 322 in which the data integrity server 102 discards or takes other preventative actions.

In block 334, the data integrity server 102 sanitizes or cleans the data file to eliminate any unknown or hidden malware. To do so, in some embodiments in block 336, the data integrity server 102 transforms and/or reformats the data file based on one or more file type-specific rules 112 in such a way that malicious code hidden within the data file is rendered benign but the original file format is retained and minimal degradation of the quality of the data file occurs. For example, in some embodiments, the data integrity server 102 utilizes one or more file type-specific rules 112 to change or modify a characteristic (e.g., structure, format, header information, etc.) of the received data file. The method 300 then advances to block 338 in which the data integrity server 102 transmits the cleaned data file to the originally intended destination (e.g., the email server 120, local upload device 130, local computing device 140, web server 150, FTP server 160, cloud storage server 170, virtual safe server 180, and/or any other computing device) internal or external to the organization.

Figure 4:
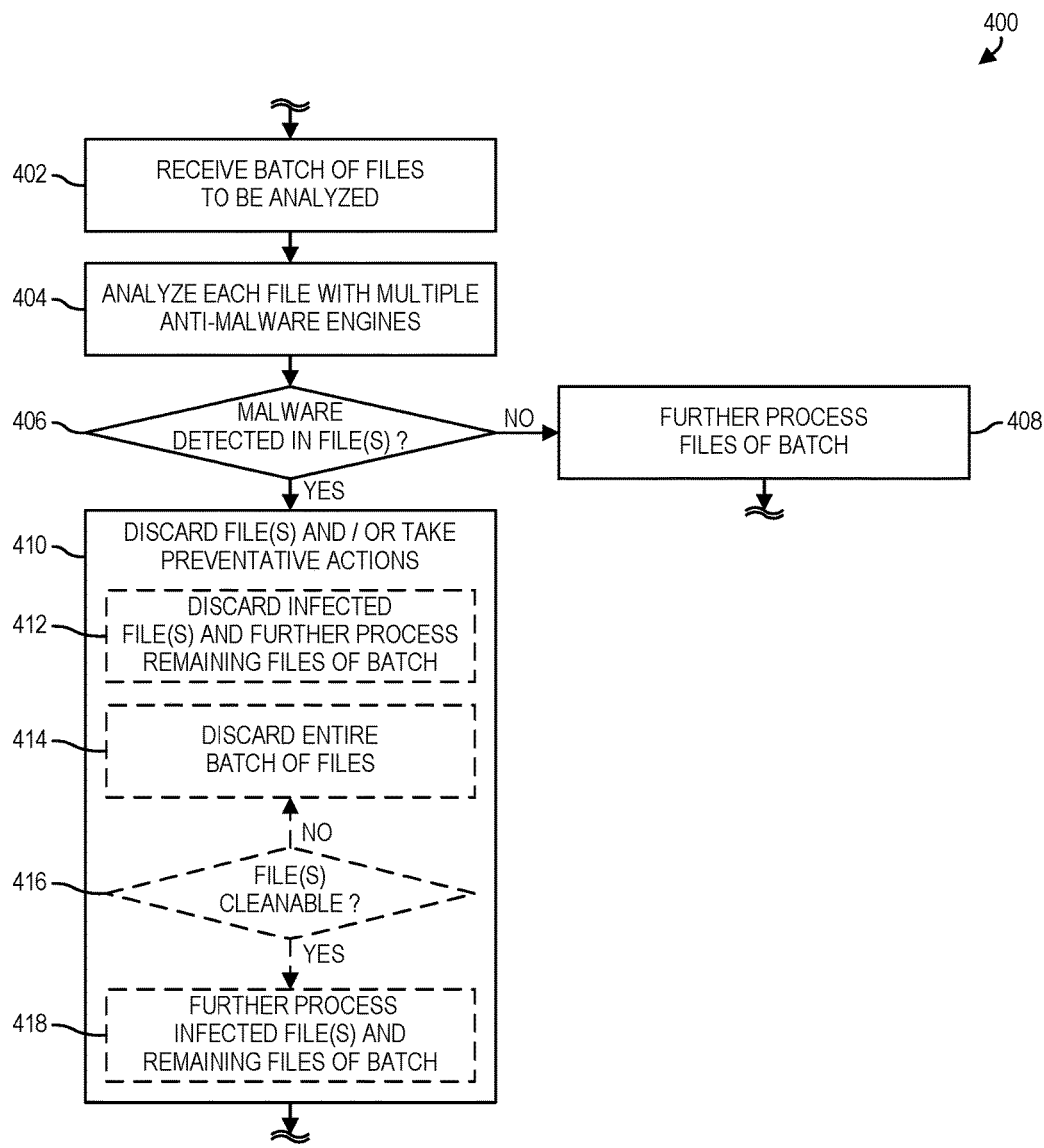
FIG. 4 is a simplified flow diagram of at least one embodiment of a method for analyzing a batch of files for malware that may be executed by the data integrity server of FIGS. 1 and 2.

Referring now to FIG. 4, a method 400 analyzing a batch of files for malware that may be executed by the data integrity server 102 begins with block 402. In block 402, the data integrity server 102 receives a batch or collection of data files to be analyzed. The data integrity server 102 may receive the batch of data files to be analyzed via any one of the various different input sources discussed above (e.g., email attachments, website downloads, employee workstations, storage clouds, virtual safes, FTP connections, physical storage media 132, etc.).

In block 404, the data integrity server 102 analyzes each data file of the batch with multiple anti-malware engines to determine whether the data file includes any known hidden malware. As discussed, each of the anti-malware engines may be embodied as any type of anti-malware or anti-virus engine configured to detect various types of malicious code or malware (e.g., viruses, spyware, adware, nagware, worms, Trojans, etc.) hidden within the data file. In some embodiments, the anti-malware engines may notify the data integrity server 102 each time malware is detected within a data file of the batch. Additionally or alternatively, the anti-malware engines may more generically notify the data integrity server 102 that malware was detected in one or more of the data files of the batch. The method 400 then advances to decision block 406. If, in decision block 406, the data integrity server 102 determines that none of the anti-malware engines (or at least a threshold or reference number of the anti-malware engines) detected malware within the data files of the batch, the method 400 advances to block 408. In block 408, the data integrity server 102 further processes each data file of the batch of data files (e.g., verify each file type based on associated file extension, clean each data file, etc.). For example, in some embodiments, the data integrity server 102 processes each data file of the batch as discussed above with reference to blocks 328-338 of FIG. 3.

Referring back to decision block 406, if the data integrity server 102 determines instead that the anti-malware engines detected malware within one or more of the data files of the batch, the method 400 advances to block 410. In block 410, the data integrity server 102 discards the data file(s) or takes other preventative actions. For example, in block 412, the data integrity server 102 discards the infected data files and further processes the remaining data files of the batch. In another example, in block 414, the data integrity server 102 discards all of the data files of the batch in response to determining that one or more of the data files contain malware. In yet another example, in decision block 416, the data integrity server 102 determines whether the infected data files are able to be cleaned. In some embodiments, the data integrity server 102 may determine whether the infected data files may be cleaned by one or more of the anti-malware engines. In other embodiments, the data integrity server 102 may determine whether it may clean the infected data files.

If, in decision block 416, the data integrity server 102 determines that the infected files may be cleaned, the method 400 advances to block 418 in which the infected files and the remaining files of the batch are further processed. If, however, the data integrity server 102 determines in decision block 416 that the infected files cannot be cleaned, the method 400 advances instead to block 414 in which the data integrity server 102 discards all of the data files of the batch.

In various embodiments disclosed herein, a single component can be replaced by multiple components and multiple components can be replaced by a single component to perform a given function or functions. Except where such substitution would not be operative, such substitution is within the intended scope of the embodiments.

Some of the figures can include a flow diagram. Although such figures can include a particular logic flow, it can be appreciated that the logic flow merely provides an exemplary implementation of the general functionality. Further, the logic flow does not necessarily have to be executed in the order presented unless otherwise indicated. In addition, the logic flow can be implemented by a hardware element, a software element executed by a computer, a firmware element embedded in hardware, or any combination thereof.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. Rather it is hereby intended the scope of the invention to be defined by the claims appended hereto.

We claim:

1. A data integrity server for protecting systems and data, the data integrity server comprising:
   a processor executing instructions stored in memory, wherein the instructions cause the processor to initialize a malware detection module, a file type verification module, and a file sterilization module;
   the malware detection module to (i) receive an image file for import from an external source, (ii) analyze the received image file with an anti-malware engine, (iii) determine whether the received image file comprises malware based on the analysis, and (iv) discard the received image file in response to a determination that the received image file comprises malware;
   the file type verification module to verify, in response to a determination that the received image file does not comprise malware, a file type of the received image file based at least in part on a file extension associated with the image file; and
   the file sterilization module to: (i) modify a resolution of the received image file based on the verified file type and a respective file type mathematical algorithm to transform the received image file into a sterilized image file to render malware not detected within the received image file benign, wherein the sterilized image file is different from the received image file and is representative of the received image file when rendered and (ii) transmit the sterilized image file to a computing device for import of the sterilized image file.

2. The data integrity server of claim 1, wherein the malware detection module is further to determine whether the received image file can be cleaned in response to a determination that the received image file comprises malware; and wherein to discard the received image file in response to a determination that the received image file comprises malware comprises to discard the received image file in response to a determination that the received image file cannot be cleaned.

3. The data integrity server of claim 2, wherein the file type verification module is further to verify, in response to a determination that the received image file can be cleaned, the file type of the received image file based at least in part on the file extension associated with the received image file.

4. The data integrity server of claim 1, wherein to analyze the received image file with an anti-malware engine comprises to analyze the received image file with a plurality of anti-malware engines.

5. The data integrity server of claim 1, wherein to verify the file type of the received image file based at least in part on the file extension associated with the received image file comprises to (i) process the received image file in a sandbox and (ii) monitor the behavior of the received image file during processing.

6. The data integrity server of claim 1, wherein to receive the image file for import from the external source comprises to receive a batch of image files for import from the external source;

wherein to analyze the received image file with an anti-malware engine comprises to analyze each image file of the batch of image files with an anti-malware engine; and wherein to determine whether the received image file comprises malware comprises to determine whether each image file of the batch comprises malware based on the analysis.

7. The data integrity server of claim 6, wherein to discard the received image file comprises to discard each image file of the batch in response to a determination that one or more of the image files of the batch comprises malware.

8. The data integrity server of claim 6, wherein to discard the received image file comprises to discard each image file in the batch determined to comprise malware.

9. The data integrity server of claim 6, wherein to discard the received image file comprises to (i) determine whether each image file in the batch determined to comprise malware can be cleaned and (ii) discard each image file of the batch in response to a determination that one or more of the image files determined to comprise malware cannot be cleaned.

10. A method for protecting systems and data, the method comprising:

receiving, by a data integrity server, an image file for import from an external source;

analyzing, by the data integrity server, the received image file with an anti-malware engine;

determining, by the data integrity server, whether the received image file comprises malware based on the analysis;

discarding, by the data integrity server, the received image file in response to determining that the received image file comprises malware;

verifying, by the data integrity server and in response to determining that the received image file does not comprise malware, a file type of the received image file based at least in part on a file extension associated with the received image file;

modifying, by the data integrity server, a resolution of the received image file based on the verified file type and a respective file type mathematical algorithm to transform the received image file into a sterilized image file to render malware not detected within the received image file benign, wherein the sterilized image file is different from the received image file and is representative of the received image file when rendered; and transmitting, by the data integrity server, the sterilized image file to a computing device for import of the sterilized image file.

11. The method of claim 10, further comprising determining, by the data integrity server, whether the received image file can be cleaned in response to a determination that the received image file comprises malware; and wherein discarding the received image file in response to a determination that the received image file comprises malware comprises discarding the received image file in response to a determination that the received image file cannot be cleaned.

12. The method of claim 11, further comprising verifying, by the data integrity server and in response to a determination that the received image file can be cleaned, the file type of the received image file based at least in part on the file extension associated with the received image file.

13. The method of claim 10, wherein analyzing the received image file with an anti-malware engine comprises analyzing the received image file with a plurality of anti-malware engines.

14. The method of claim 10, wherein verifying the file type of the received image file based at least in part on the file extension associated with the received image file comprises (i) processing the received image file in a sandbox and (ii) monitoring the behavior of the received image file during processing.

15. The method of claim 10, wherein receiving the image file for import from the external source comprises receiving a batch of image files for import from the external source;

wherein analyzing the received image file with an anti-malware engine comprises analyzing each image file of the batch of image files with an anti-malware engine; and wherein determining whether the received image file comprises malware comprises determining whether each image file of the batch comprises malware based on the analysis.

16. The method of claim 15, wherein discard the received image file comprises to discard each image file of the batch in response to a determination that one or more of the image files of the batch comprises malware.

17. The method of claim 15, wherein to discard the received image file comprises to discard each image file in the batch determined to comprise malware.

18. The method of claim 15, wherein to discard the received image file comprises to (i) determine whether each image file in the batch determined to comprise malware can be cleaned and (ii) discard each image file of the batch in response to a determination that one or more of the image files determined to comprise malware cannot be cleaned.

19. One or more non-transitory machine-readable storage media comprising a plurality of instructions stored thereon that in response to being executed by a data integrity server, cause the data integrity server to:

receive an image file for import from an external source;

analyze the received image file with an anti-malware engine;

determine whether the received image file comprises malware based on the analysis;

discard the received image file in response to a determination that the received image file comprises malware;

verify, in response to a determination that the received image file does not comprise malware, a file type of the received image file based at least in part on a file extension associated with the image file;

modify a resolution of the received image file based on the verified file type and a respective file type mathematical algorithm to transform the received image file into a sterilized image file to render malware not detected within the received image file benign, wherein the sterilized image file is different from the received image file and is representative of the received image file when rendered; and transmit the sterilized image file to a computing device for import of the sterilized image file.

20. The one or more non-transitory machine-readable storage media of claim 19, wherein to receive the image file for import from the external source comprises to receive a batch of image files for import from the external source;

wherein to analyze the received image file with an anti-malware engine comprises to analyze each image file of the batch of image files with an anti-malware engine; and wherein to determine whether the received image file comprises malware comprises to determine whether each image file of the batch comprises malware based on the analysis.

* * * * *